United States Patent
Kurita (10) Patent No.: US 9,003,099 B2
(45) Date of Patent: Apr. 7, 2015

(54) DISC DEVICE PROVIDED WITH PRIMARY AND SECONDARY CACHES

(75) Inventor: Shun Kurita, Tokyo (JP)

(73) Assignee: NEC Corporation, Tokyo (JP)

( * ) Notice: Subject to any disclaimer, the term of this patent is extended or adjusted under 35 U.S.C. 154(b) by 457 days.

(21) Appl. No.: 13/036,501

(22) Filed: Feb. 28, 2011

(65) Prior Publication Data

US 2011/0238908 A1 Sep. 29, 2011

(30) Foreign Application Priority Data

Mar. 26, 2010 (JP) .................. 2010-071431

(51) Int. Cl.
*G06F 12/08* (2006.01)
*G06F 12/12* (2006.01)

(52) U.S. Cl.
CPC ...... *G06F 12/0871* (2013.01); *G06F 2212/283* (2013.01); *G06F 2212/604* (2013.01); *G06F 12/128* (2013.01); *G06F 2212/225* (2013.01); *G06F 12/122* (2013.01); *G06F 12/0897* (2013.01); *G06F 12/12* (2013.01); *G06F 2212/222* (2013.01)

(58) Field of Classification Search
CPC ............ G06F 12/128; G06F 2212/225; G06F 2212/604
See application file for complete search history.

(56) References Cited

U.S. PATENT DOCUMENTS

| 5,627,990 | A | * | 5/1997 | Cord et al. | 711/122 |
|---|---|---|---|---|---|
| 8,458,402 | B1 | * | 6/2013 | Karnik | 711/122 |
| 8,825,937 | B2 | * | 9/2014 | Atkisson et al. | 711/102 |
| 2002/0103965 | A1 | * | 8/2002 | Dawkins et al. | 711/113 |
| 2006/0149902 | A1 | * | 7/2006 | Yun et al. | 711/118 |
| 2008/0059707 | A1 | * | 3/2008 | Makineni et al. | 711/122 |
| 2008/0104344 | A1 | * | 5/2008 | Shimozono et al. | 711/162 |
| 2008/0114930 | A1 | * | 5/2008 | Sanvido et al. | 711/113 |
| 2008/0147974 | A1 | * | 6/2008 | Madison et al. | 711/118 |
| 2009/0037664 | A1 | * | 2/2009 | Kornegay et al. | 711/138 |
| 2009/0043967 | A1 | * | 2/2009 | Provenzano et al. | 711/136 |
| 2009/0216936 | A1 | * | 8/2009 | Chu et al. | 711/103 |
| 2009/0216945 | A1 | * | 8/2009 | Shimada | 711/113 |
| 2009/0327584 | A1 | * | 12/2009 | Tetrick et al. | 711/103 |
| 2010/0274962 | A1 | * | 10/2010 | Mosek et al. | 711/113 |
| 2011/0271048 | A1 | * | 11/2011 | Fuji et al. | 711/113 |
| 2012/0017034 | A1 | * | 1/2012 | Maheshwari et al. | 711/103 |
| 2012/0089782 | A1 | * | 4/2012 | McKean et al. | 711/122 |

FOREIGN PATENT DOCUMENTS

JP 2009163647 A 7/2009

OTHER PUBLICATIONS

Mazen Kharbutli and Yan Solihin. "Counter-Based Cache Replacement and Bypassing Algorithms." Apr. 2008. IEEE. IEEE Transactions on Computers. vol. 57. pp. 433-447.*

(Continued)

*Primary Examiner* — Nathan Sadler
(74) *Attorney, Agent, or Firm* — Sughrue Mion, PLLC (57) ABSTRACT

In a disc device according to the present invention, when a controller 2 abandons a block from a cache memory 4 used as a primary cache, it is determined whether or not the number of readings of data in the block exceeds the specified number of times. Only when the number of readings exceeds the specified number of times, the block is written into an SSD 8 used as a secondary cache. When the number of readings is equal to or smaller than the specified number of times, the block is rewritten into an HDD 7.

8 Claims, 8 Drawing Sheets

MANAGEMENT INFORMATION LIST PART 43

| CACHE PAGE NUMBER (431) | THE NUMBER OF READINGS (432) | SSD FLAG (433) | LRU INFORMATION (434) | CHANGE FLAG (435) |
|---|---|---|---|---|
| 0 | 30 | 0 | | |
| 1 | 100 | 1 | | |
| 2 | 70 | 0 | | |
| 3 | 120 | 1 | | |
| N | 10 | 0 | | |

(56) References Cited

OTHER PUBLICATIONS

Hsien-Hsin S. Lee et al. Eager Writeback—a Technique for Improving Bandwidth Utilization. 2000. ACM. MICRO 33.*

Adam Leventhal. "Flash Storage Memory." Jul. 2008. ACM. Communications of the ACM. vol. 51. No. 7. pp. 47-51.*

Lingxiang Xiang et al. "Less Reused Filter: Improving L2 Cache Performance via Filtering Less Reused Lines." Jun. 2009. ACM. ICS'09. pp. 68-79.*

Arkaprava Basu et al. "Scavenger: A New Last Level Cache Architecture with Global Block Priority." Dec. 2007. IEEE. MICRO-40. pp. 421-432.*

\* cited by examiner

MANAGEMENT INFORMATION LIST PART 43

| CACHE PAGE NUMBER (431) | THE NUMBER OF READINGS (432) | SSD FLAG (433) | LRU INFORMATION (434) | CHANGE FLAG (435) |
|---|---|---|---|---|
| 0 | 30 | 0 | | |
| 1 | 100 | 1 | | |
| 2 | 70 | 0 | | |
| 3 | 120 | 1 | | |
| N | 10 | 0 | | |

FIG. 8

DISC DEVICE PROVIDED WITH PRIMARY AND SECONDARY CACHES

The present invention claims priority to Japanese Patent Application No. 2010-071431, filed on Mar. 26, 2010 in Japan, the disclosure of which is incorporated by reference herein in its entirety.

TECHNICAL FIELD

The present invention relates to a disc device provided with a cache memory.

BACKGROUND ART

Disc devices such as magnetic disc devices, optical disc devices, data array devices are generally provided with a cache memory in terms of system performance and the like. The cache memory is typically configured of a nonvolatile memory such as SRAM (Static Random Access Memory) and DRAM (Dynamic Random Access Memory) and stores data accessed during operation of the disc device therein. At next access request, when requested data exists in the cache memory, the data in the high-speed cache memory can be used without having to access a low-speed disc. Thereby, a response performance to the access request can be improved.

To further improve the response performance, in some disc devices provided with the cache memory, a part of HDD (Hard Disk Drive) is replaced with SSD (Solid State Drive) is known (for example, refer to Patent document 1). The SSD is a disc drive using a nonvolatile flash memory as a storage element. Although the SSD can read/write data at higher speed than the HDD, the SSD has a limitation in the number of times of erasure/writing from/to blocks. For this reason, according to a technique described in Patent document 1, by recording data in a section of a storage area, which is often rewritten (Write block), into the HDD and recording data in a section of the storage area, which is not rewritten so much, but is often read (Read block), into the SSD, the life of the SSD is extended while improving the response performance.

[Patent document 1] Unexamined Patent Publication No. 2009-163647

According to the technique described in Patent document 1, the life of the SSD can be extended while improving the response performance. However, disadvantageously, the technique described in Patent document 1 can be applied to only disc devices in which the storage area is divided into the Write block that is often rewritten and the Read block that is not rewritten and often read.

By the way, a technique of stratifying the cache memory into a primary cache, secondary cache, . . . is known as one of techniques for improving the response performance. This technique can improve the response performance even in disc devices in which the storage area cannot be divided into the Write block and the Read block. Because the response performance can be improved as the capacity of the secondary cache is larger, a mass storage SSD may be used as the secondary cache.

However, since the SSD has the limitation in the number of times of erasure/writing from/to blocks, when the SSD is used as the secondary cache, the following problem occurs. If an access request to a block that does not exist in the primary cache is made in the case where all cache pages (cache lines) of the primary cache are used, one block is expelled from the primary cache and is written to the secondary cache. Accordingly, when the SSD is used as the secondary cache, the writing processing of the block expelled from the primary cache disadvantageously shortens the life of the secondary cache.

SUMMARY OF THE INVENTION

Therefore, an object of the present invention is to provide a disc device that can solve the problem that, when the SSD is used as the secondary cache, the life of the secondary cache is shortened.

A disc device according to a first aspect of the present invention includes:
 a disc;
 a primary cache that records a copy of a part of data recorded in the disc therein;
 a secondary cache formed of an SSD, the secondary cache recording a copy of a part of data recorded in the disc therein; and
 a control unit, wherein
 in the case where the number of readings of a block selected to be abandoned in the primary cache in order to make a blank area in the primary cache exceeds a threshold, the control unit records the block in the secondary cache, and
 at read request,
 when data to be read exists in the primary cache, the control unit returns the data to be read in the primary cache to a requester, and
 when the data to be read does not exist in the primary cache and exists in the secondary cache, the control unit writes a block containing the data to be read that exists in the secondary cache into the primary cache and then, returns the data to be read to the requester.

A secondary cache utilizing method according to the present invention includes a disc, a primary cache that records a copy of a part of data recorded in the disc therein and a secondary cache formed of an SSD, the secondary cache recording a copy of a part of data recorded in the disc therein, wherein
 a control unit,
 in the case where the number of readings of a block selected to be abandoned in the primary cache in order to make a blank area in the primary cache exceeds a threshold, the control unit records the block in the secondary cache, and
 at read request,
 when data to be read exists in the primary cache, the control unit returns the data to be read in the primary cache to a requester, and
 when the data to be read does not exist in the primary cache and exists in the secondary cache, the control unit writes a block containing the data to be read that exists in the secondary cache into the primary cache and then, returns the data to be read to the requester.

A computer-readable recording medium having a program according to the present invention has a program for allowing a CPU mounted in a disc device including a disc, a primary cache that records a copy of a part of data recorded in the disc therein and a secondary cache formed of an SSD, the secondary cache recording a copy of a part of data recorded in the disc therein to function as a control unit, wherein
 in the case where the number of readings of a block selected to be abandoned in the primary cache in order to make a blank area in the primary cache exceeds a threshold, the control unit records the block in the secondary cache, and
 at read request, when data to be read exists in the primary cache, the control unit returns the data to be read in the primary cache to a requester, and when the data to be read does not exist in the primary cache and exists in the secondary cache, the control unit writes a block containing the data to be read that exists in the secondary cache into the primary cache and then, returns the data to be read to the requester.

According to the present invention, it is possible to solve the problem that, when the SSD is used as the secondary cache, the life of the secondary cache is shortened.

DETAILED DESCRIPTION OF PREFERRED EXEMPLARY EMBODIMENT

Next, an exemplary embodiment of the present invention will be described in detail with reference to figures.

Figure 1:
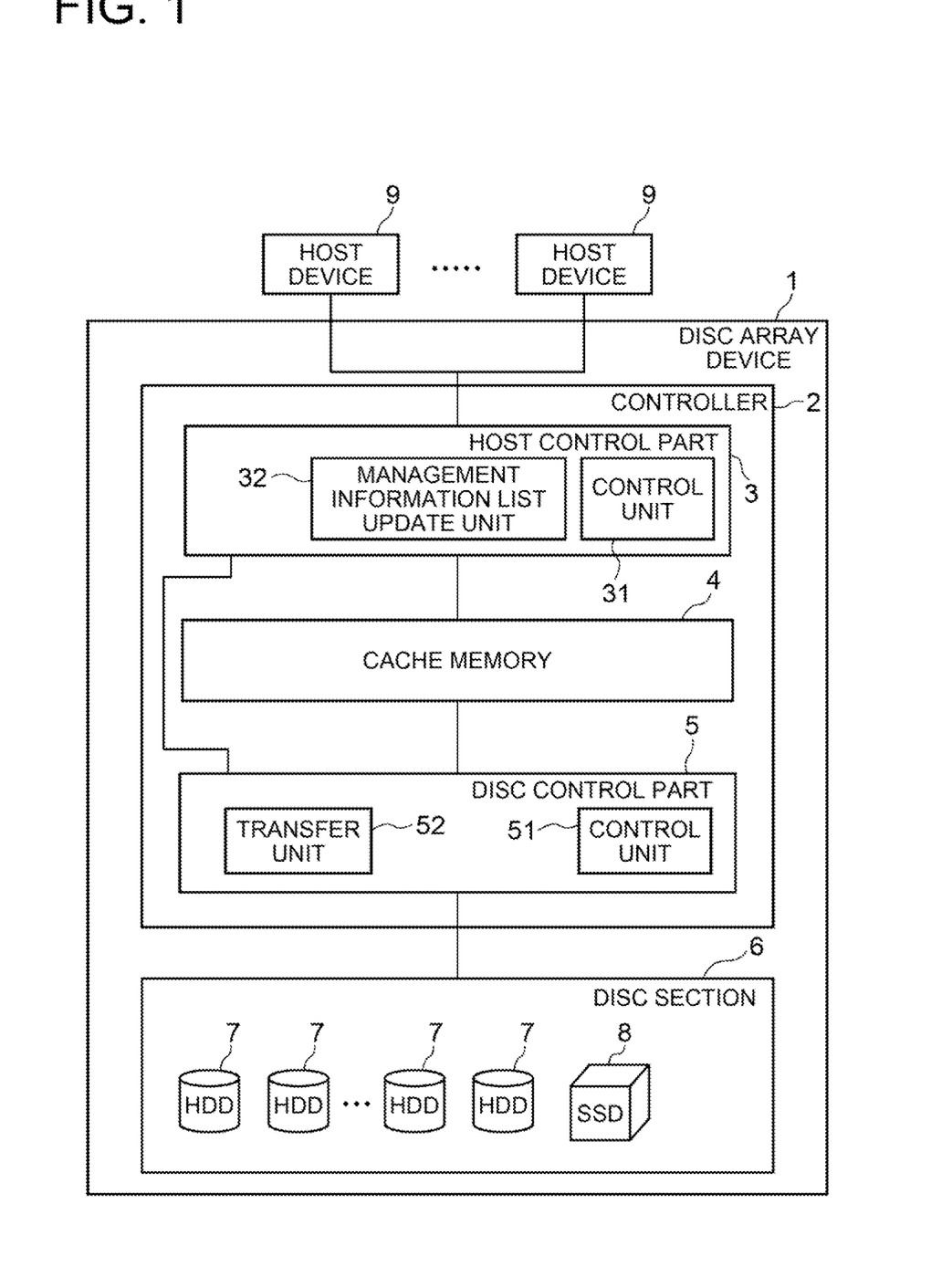
FIG. 1 is a block diagram showing a configuration example of an exemplary embodiment of the present invention.

FIG. 1 shows a disc array device 1 as a first exemplary embodiment of the present invention. In FIG. 1, the disc array device 1 includes a controller 2 and a disc section 6.

The disc section 6 has a plurality of HDDs 7 managed by RAID (Redundant Arrays of Inexpensive Disks) and an SSD 8 used as a secondary cache. A copy of a part of data recorded in the HDDs 7 is recorded in the SSD 8 used as the secondary cache. Although one SSD 8 is shown in FIG. 1, a plurality of SSDs 8 may be provided.

The controller 2 has a host control part 3, a cache memory 4 used as a primary cache and a disc control part 5.

Figure 2:
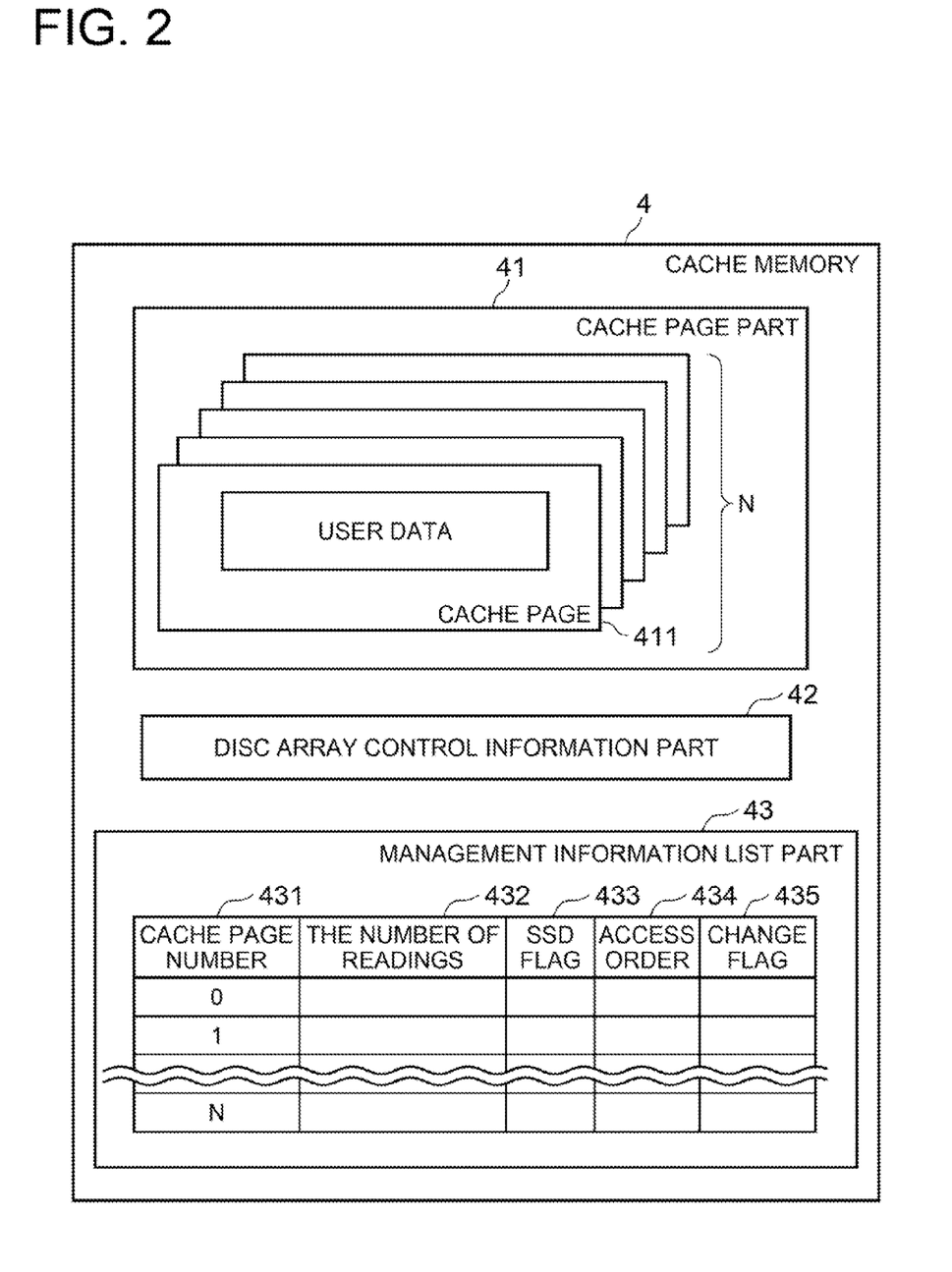
FIG. 2 is a diagram showing an example of details in a cache memory 4.

Referring to FIG. 2, the cache memory 4 has a cache page part 41, a disc array control information part 42 and a management information list part 43.

The cache page part 41 is composed of a plurality of cache pages (cache lines) 411 of predetermined size and a copy of a part of data recorded in the HDDs 7 is recorded in each of the cache pages 411. A unique cache page number is allocated to each of the cache pages 411.

The disc array control information part 42 records disc array control information (for example, information indicating RAID structure) that is necessary for the disc control part 5 to control a disc array therein.

For each cache page number (also referred to as merely page number) 431 allocated to the corresponding cache page 411, the management information list part 43 records the number of times data in the block stored in the cache page has been read by the host control part 3 (the number of readings) 432, an SSD flag 433 indicating whether or not the number of readings of the cache page exceeds the specified number of times previously specified, an access order 434 indicating the order of the cache page when counted from the cache page accessed latest and a change flag 435 indicating whether or not data that is different from corresponding data in the HDD 7 or the SSD 8 in contents exists among data stored in the cache page. In this exemplary embodiment, the SSD flag 433 is invalid ("0") in the case where the number of readings is equal to or smaller than the specified number of times and is valid ("1") in the case where the number of readings exceeds the specified number of times.

The host control part 3 processes the access request from a host device 9 such as a computer and has a control unit 31 and a management information list update unit 32.

The control unit 31 receives the access request from the host device 9, determines what type is the request (write request or read request), whether or not requested data exists in the cache memory 4, whether or not replacement of the block is required or the like, and performs processing according to a determination result. At this time, the control unit 31 uses the management information list update unit 32 or outputs a processing request to the disc control part 5 according to need.

When being notified from the control unit 31 of the cache page number whose number of readings is to be incremented, the management information list update unit 32 increments the number of readings recorded in association with the notified cache page number among the number of readings 432 recorded in the management information list part 43. When the incremented number of readings exceeds the specified number of times, the management information list update unit 32 sets the SSD flag 433 to "1".

The disc control part 5 reads/writes data from/into the HDD 7 or the SSD 8 in the disc section 6 according to an instruction from the host control part 3, and has a control unit 51 and a transfer unit 52.

The control unit 51 processes a request from the host control part 3. At this time, the control unit 51 uses the transfer unit 52 at need.

According to an instruction from the control unit 51, the transfer unit 52 writes a block in the HDD 7 or the SSD 8 into the cache page 411 or writes a block stored in the cache page 411 into the HDD 7 or the SSD 8.

The controller 2 can be implemented by a CPU (Central Processing Unit). When the controller 2 is implemented by the CPU, a recording medium such as a disc that having a program for allowing the CPU to function as both the host control part 3 and the disc control part 5 is prepared and the CPU is caused to read the program. The CPU controls its operations according to the read program to implement the host control part 3 and the disc control part 5 thereon.

Next, operations of this exemplary embodiment will be described in detail.

Figure 3:
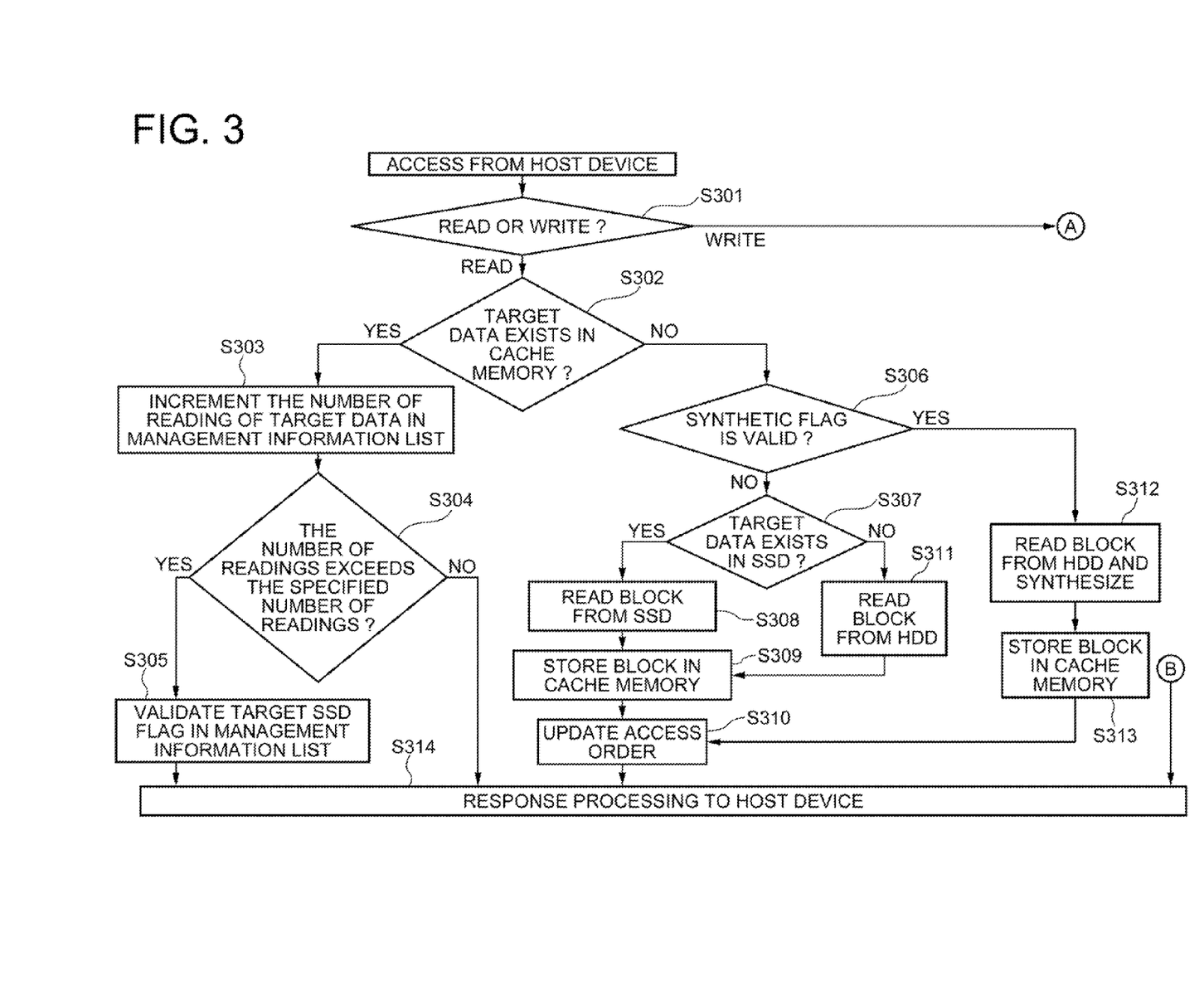
FIG. 3 is a flowchart showing an example of processing (mainly at read request) in accordance with an exemplary embodiment of the present invention.

Referring to FIG. 3, when receiving the access request from the host device 9, the control unit 31 in the host control part 3 determines which type of the access request is a write request or a read request (Step S301).

Figure 6:
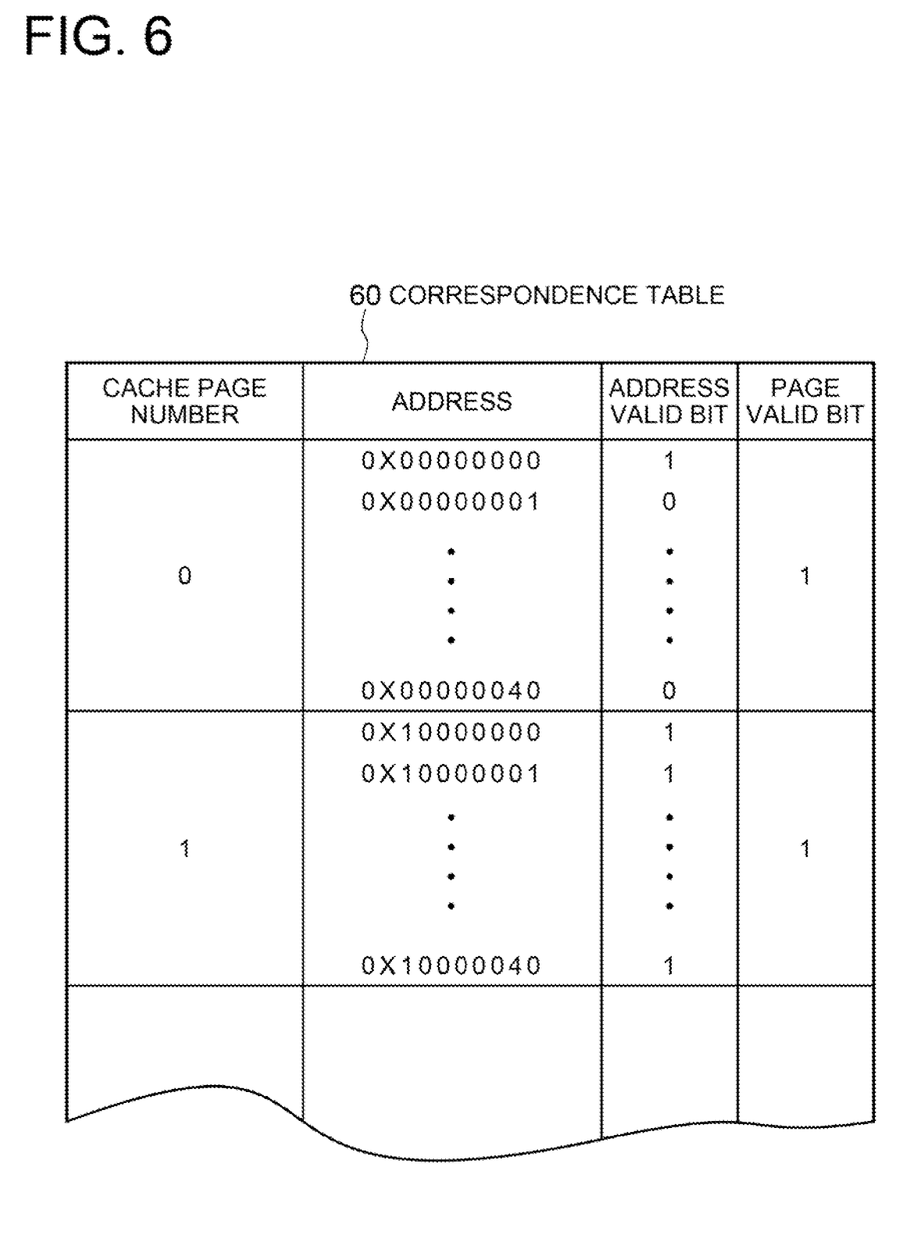
FIG. 6 is a diagram showing an example of contents of a correspondence table 60.

When the access request is the read request, the control unit 31 determines whether or not requested data exists in the cache memory 4 (Step S302). For example, this determination is performed by referring to a correspondence table 60 as shown in FIG. 6. In the correspondence table 60, each cache page number is associated with addresses of a plurality of pieces of data constituting a block stored in the cache page, address valid bits each indicating whether or not data at the address is valid and a page valid bit indicating whether or not the cache page is valid. That is, the control unit 31 determines whether or not the requested data exists in the cache memory 4 by searching the correspondence table 60 and examining whether or not a same address as a read address in the read request, which is associated with the cache page number having the valid page valid bit ("1") and the valid address valid bit ("1"), is recorded in the correspondence table 60.

In Step S302, when determining that the same address as the read address in the read request, which is associated with the cache page number having the valid page valid bit ("1") but having the invalid address valid bit ("0"), is recorded, the control unit 31 validates a synthetic flag and holds the cache page number recorded in association with the above-mentioned read address. For example, When in the correspondence table 60 shown in FIG. 6, the read address in the read request is "0x00000001", the read address "0x00000001" is registered in association with the cache page number "0" with the valid page valid bit, but the corresponding address valid bit is invalid ("0"). Accordingly, the control unit 31 validates the synthetic flag ("1") and holds the cache page number "0".

When the read-requested data exists in the cache memory 4 (YES in Step S302), the control unit 31 notifies the page number of the cache page storing the requested data therein to the management information list update unit 32 to instruct the management information list update unit 32 to increment the number of readings of this cache page. Thereby, the management information list update unit 32 increments the number of readings of the cache page, which is notified from the control unit 31, among the number of readings 432 recorded in the management information list part 43 (Step S303). In Step S303, the management information list update unit 32 also performs processing of updating the access order of the cache page notified from the control unit 31 among the access order 434 recorded in the management information list part 43 to the access order indicating the latest access and moving down the access order of the other cache pages while keeping the sequence.

Then, the management information list update unit 32 compares the incremented number of readings with the specified number of times previously specified, and determines whether or not the number of readings exceeds the specified number of times (Step S304).

When determining that the number of readings is equal to or smaller than the specified number of times, the management information list update unit 32 notifies end of processing to the control unit 31, and when determining that the number of readings exceeds the specified number of times, the management information list update unit 32 validates the SSD flag 433 of the cache page notified from the control unit 31 (Step S305), and notifies end of processing to the control unit 31. In response to this notification, the control unit 31 performs response processing to a host device described later (Step S314).

Meanwhile, when determining that the read-requested data does not exist in the cache memory 4 in Step S302, the control unit 31 determines whether or not the synthetic flag is valid ("1") (Step S306).

When the synthetic flag is invalid (NO in Step S306), the control unit 31 transmits the address of the read-requested data to the disc control part 5 and instructs the disc control part 5 to store a block containing the data in the cache memory 4. Thereby, the control unit 51 in the disc control part 5 determines whether or not the block containing the data exists in the SSD 8 used as the secondary cache exists (Step S307). This determination is performed by referring to an SSD correspondence table (not shown) in which each page number of the cache pages in the SSD 8 is associated with a block number of a block recorded in the cache page and a valid bit indicating whether or not the cache page is valid. That is, when the block number of the block containing the read-requested data is recorded in the SSD correspondence table and the corresponding valid bit is valid, the disc control part 5 determines that the block containing the data exists in the SSD 8.

When determining that the block containing the data exists in the SSD 8, the control unit 51 reads the block containing the requested data from the SSD 8 through the transfer unit 52, writes the block into a blank cache page in the cache memory 4 and updates the correspondence table 60 (Step S308, S309). In the update processing of the correspondence table 60, the control unit 51 validates the page valid bit and the address valid bits, which are associated with the page number of the cache page into which the block is written, and records addresses of pieces of data in the block in association of the page number. After that, the control unit 51 notifies the page number of the cache page into which the block is written to the host control part 3. In response to this notification, the control unit 31 in the host control part 3 performs the processing of updating the access order recorded in the management information list part 43 (Step S310) and then, the response processing to the host device (Step S314). On the other hand, when determining that the block containing the data does not exist in the SSD 8 (NO in Step S307), the control unit 51 reads the block containing the requested data from the HDD 7 and stores the block in the cache memory 4, and updates the correspondence table 60 (Step S311, S309) and then, performs the above-mentioned processing in Step S310.

When determining that the synthetic flag is valid in Step S306, the control unit 31 notifies an address of the read-requested data and the cache page number held in Step S302 to the disc control part 5 and instructs the disc control part 5 to synthesize contents of a block containing the data in the HDD with contents of the cache page having the above-mentioned cache page number. According to the instruction, the control unit 51 in the disc control part 5 reads the relevant block from the HDD 7 as well as the contents of the cache page having the above-mentioned cache page number. Then, the control unit 51 replaces data having addresses with the valid address valid bits in the correspondence table 60 among the data read from the HDD 7 with corresponding data read from the cache page (Step S312). For example, when an address valid bit of a leading address in the block is valid, the control unit 51 replaces leading data in the block read from the HDD 7 with leading data in the block read from the relevant cache page. After that, the control unit 51 stores the synthesized block in the above-mentioned cache page in the cache memory 4 and validates all of the address valid bits associated with the cache page in the correspondence table 60 (Step S313). Then, the control unit 51 notifies the page number of the cache page into which the block is written to the host control part 3. Thus, the control unit 31 in the host control part 3 performs the above-mentioned processing in Step S310.

Figure 4:
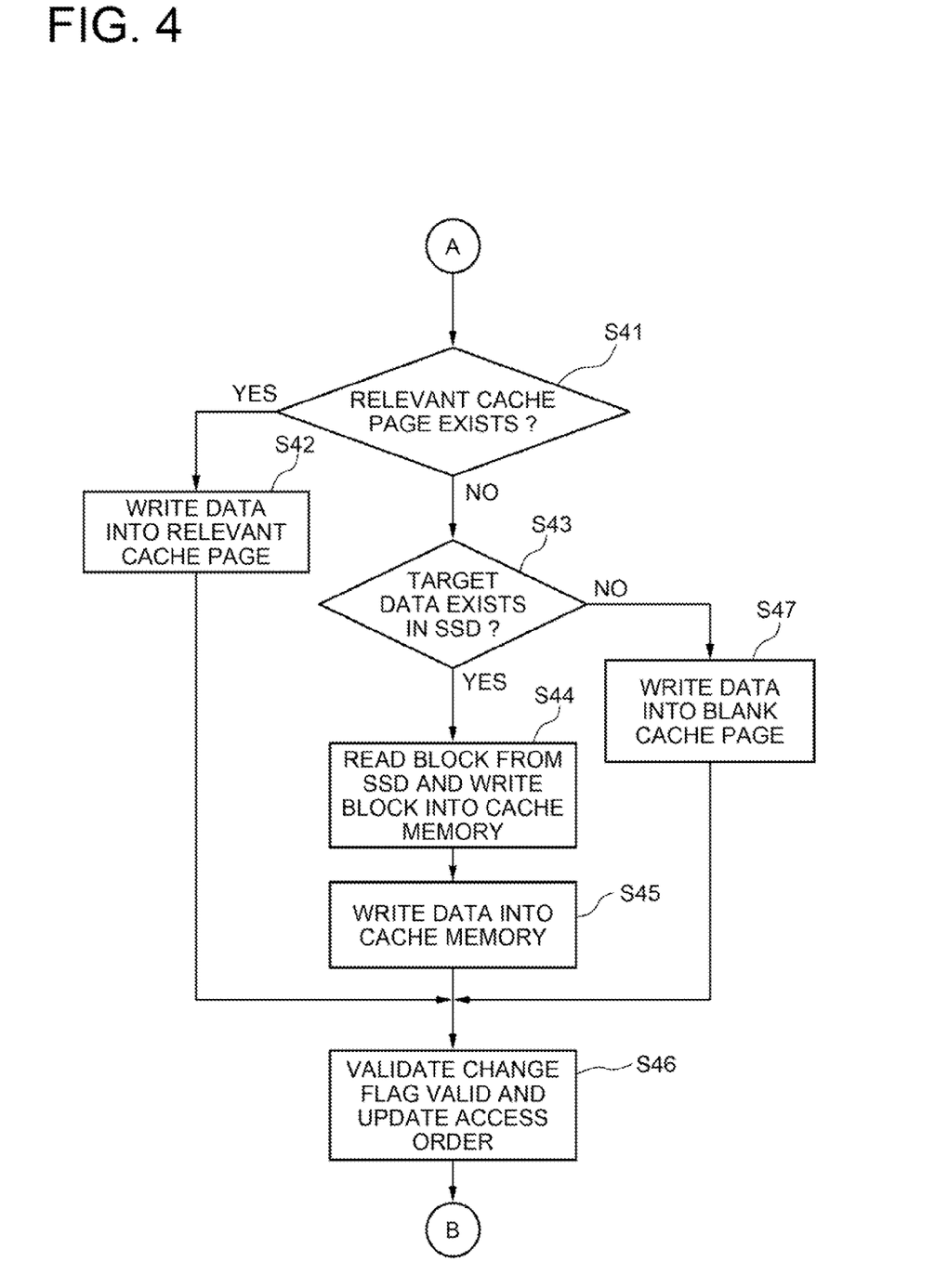
FIG. 4 is a flowchart showing an example of processing (mainly at write request) in accordance with the exemplary embodiment of the present invention.

When determining that the access request from the host device 9 is the write request in Step S301, as shown in the flowchart in FIG. 4, the control unit 31 determines whether or not a cache page (relevant cache page) relating to a block containing write-requested data exists in the cache memory 4 (Step S41). This determination is performed by searching the correspondence table 60 and determining whether or not a cache page number associated with a valid page valid bit and a same address as a write address in the write request exists in the correspondence table 60.

When determining that the relevant cache page exists, the control unit 31 writes data into a relevant position in the cache page and validates the address valid bit corresponding to the address where the data is written (Step S42). After that, the control unit 31 transmits the page number of the cache page storing the write-requested data therein to the management information list update unit 32 and instructs the management information list update unit 32 to validate a change flag corresponding to the page number. According to the instruction, the management information list update unit 32 validates the change flag of the cache page, which is instructed from the control unit 31, among the change flags 435 recorded in the management information list part 43 and further, performs the above-mentioned processing of updating the access order 434 (Step S46). After that, the control unit 31 performs the response processing to the host device (Step S314).

When determining that the relevant cache page does not exist in the cache memory 4, the control unit 31 transmits an address of the write-requested data to the disc control part 5 and instructs the disc control part 5 to store a block containing the data in the cache memory 4. Thereby, the control unit 51 in the disc control part 5 determines whether or not the block containing the data exists is the SSD 8 (Step S43).

When determining that the block containing the data exists is the SSD 8, the control unit 51 reads the relevant block from the SSD 8 through the transfer unit 52 and writes the block into the blank cache page in the cache memory 4 (Step S44). After that, the control unit 51 notifies the page number of the cache page into which the block is written to the host control part 3. Thus, the control unit 31 in the host control part 3 writes the write-request data at a relevant position in the cache page and further, performs processing of updating the correspondence table 60 (Step S45). After that, the above-mentioned processing in Step S46 is performed.

On the contrary, when determining that the block containing the data does not exist is the SSD 8, the control unit 51 notifies the information to the host control part 3. Thus, the control unit 31 in the host control part 3 writes the write-requested data into a blank cache page in the cache memory 4 and performs processing of updating the correspondence table 60 (Step S47). When finishing the processing in Step S45 or Step S47, the control unit 31 performs the above-mentioned processing in Step S46 and then, performs the response processing to the host device (Step S314).

In the response processing to the host device in Step S314, when the access request from the host device 9 is the read request, the host control part 3 returns the data to be read that exists in the cache memory 4 to the requesting host device 9 and then, transmits end of reading processing to the host device 9. When the access request from the host device 9 is the write request, the host control part 3 transmits end of writing processing to the host device 9.

Although not shown in the flowcharts in FIG. 3 and FIG. 4, when all of the cache pages in the cache memory 4 are used (no blank cache page exists) and the access request to a block that does not exists in the cache memory 4 is transmitted from the host device 9, it is required to perform abandonment processing of abandoning (expelling) one block stored in any of cache pages in the cache memory from the cache memory 4 to make a blank cache page in the cache memory 4. Such abandonment processing is performed when a determination result in Step S302 is NO and a determination result in Step S41 is NO in the case where all of the cache pages in the cache memory 4 are used. Then, when the abandonment processing is finished, the processing in Step S306 or Step S43 is performed. The abandonment processing will be described below with reference to a flowchart in FIG. 5.

Figure 5:
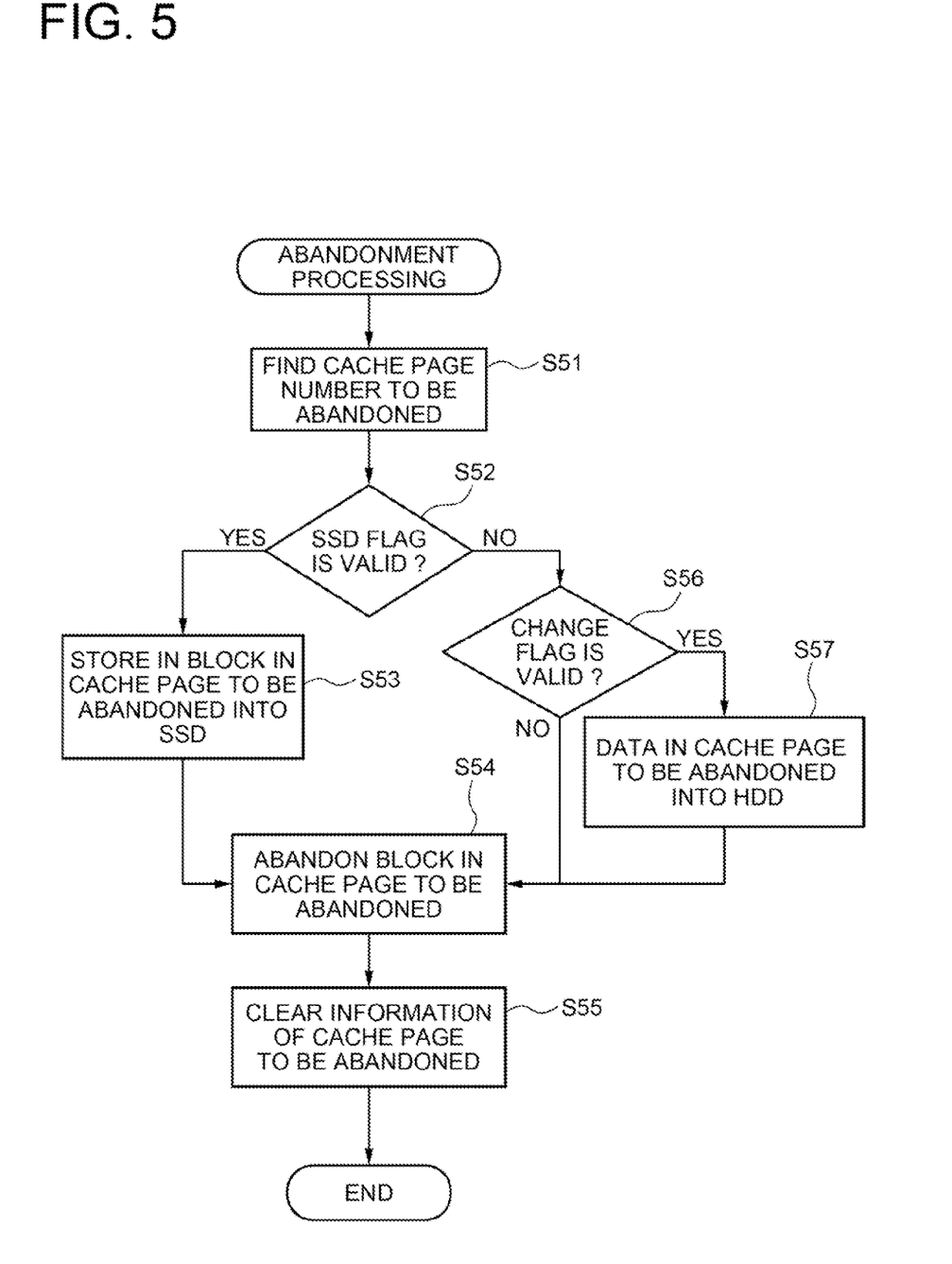
FIG. 5 is a flowchart showing an example of processing (at abandonment of block from the cache memory) in accordance with the exemplary embodiment of the present invention.

Referring to FIG. 5, the control unit 31 in the host control part 3 first finds the page number of a cache page (cache page to be abandoned) in which a block to be abandoned is stored (Step S51). Specifically, the control unit 31 finds the page number of the cache page in which a block referred least recently is stored based on the access order 434 of cache pages recorded in the management information list part 43 and sets the found page number to the page number of the cache page to be abandoned. That is, in this exemplary embodiment, according to an LRU (Least Recently Used) method, the cache page to be abandoned is decided. However, a method of deciding the cache page to be abandoned is not limited to the LRU method, and other methods such as an LFU (Least Frequently Used) method of setting a cache page in which a block referred least frequently to the cache page to be abandoned may be used.

After that, the control unit 31 determines whether or not the SSD flag 433 recorded in association with the page number of the cache page to be abandoned is valid (Step S52).

When determining that the SSD flag 433 is valid, the control unit 31 instructs the disc control part 5 to write the block stored in the cache page to be abandoned into the SSD 8. According to the instruction, the control unit 51 in the disc control part 5 writes the block stored in the cache page to be abandoned into the cache memory 4 to the SSD 8 through the transfer unit 52 SD (Step S53). That is, when the block number of the above-mentioned block is recorded in the SSD correspondence table, the control unit 51 writes the block into the cache page (the cache page in the SSD 8) having the cache page number recorded in association with the block number. When the above-mentioned block number is not recorded in the SSD correspondence table, the control unit 51 records the block number in association with the page number of the blank cache page and validates the valid bit. Then, the control unit 31 in the host control part 3 abandons the block stored in the cache page to be abandoned by making the page valid bit and the address valid bits, which are associated with the cache page to be abandoned in the correspondence table 60, invalid (Step S54). Further, the control unit 31 clears the number of readings 432, the SSD flag 433, the access order 434 and the change flag 435 that are recorded in association with the page number of the cache page to be abandoned by use of the management information list update unit 32 (Step S55).

On the other hand, when the SSD flag 433 of the cache page to be abandoned is invalid (NO in Step S52), the control unit 31 determines whether or not the change flag 435 of the cache page to be abandoned is valid (Step S56).

When determining that the change flag 435 is valid, since contents of the block in the cache memory 4 do not match contents of the corresponding block in the HDD 7, the control unit 31 instructs the disc control part 5 to rewrite data having the valid address valid bits in the correspondence table 60 among data stored in the cache page to be abandoned into the HDD 7. According to the instruction, the control unit 51 in the disc control part 5 rewrites the relevant data stored in the cache page to be abandoned into the HDD 7 through the transfer unit 52 (Step S57). In Step S57, when the block number of a block containing the above-mentioned data is recorded in the SSD correspondence table, the control unit 51 invalidates the valid bits recorded in association with the block number. After that, the control unit 31 performs the above-mentioned processing in Steps S54 and S55.

On the other hand, when change flag 435 is invalid, since the contents of the block in the cache memory 4 match the contents of the corresponding block in the HDD 7, the control unit 31 immediately performs the above-mentioned processing in Steps S54 and S55.

In addition to the above-mentioned processing, the following processing may be performed. The control unit 51 in the disc control part 5 periodically refers to the change flags 435 in the management information list part 43. Then, when a cache page having a valid change flag 435 exists, the control unit 51 rewrites data having the valid address valid bit among data stored in the above-mentioned cache page into the HDD 7 through the transfer unit 52 and then, invalidates the relevant change flag 435. Further, when the block number of the block containing the above-mentioned data is recorded in the SSD correspondence table, the control unit 51 invalidates the valid bit recorded in association with the block number. Since the number of times of the above-mentioned processing in Step S57 in FIG. 4 can be reduced through such processing, the response performance to the access request from the host device 9 can be further improved.

Next, operations of this exemplary embodiment will be described using a specific example.

Figure 7:
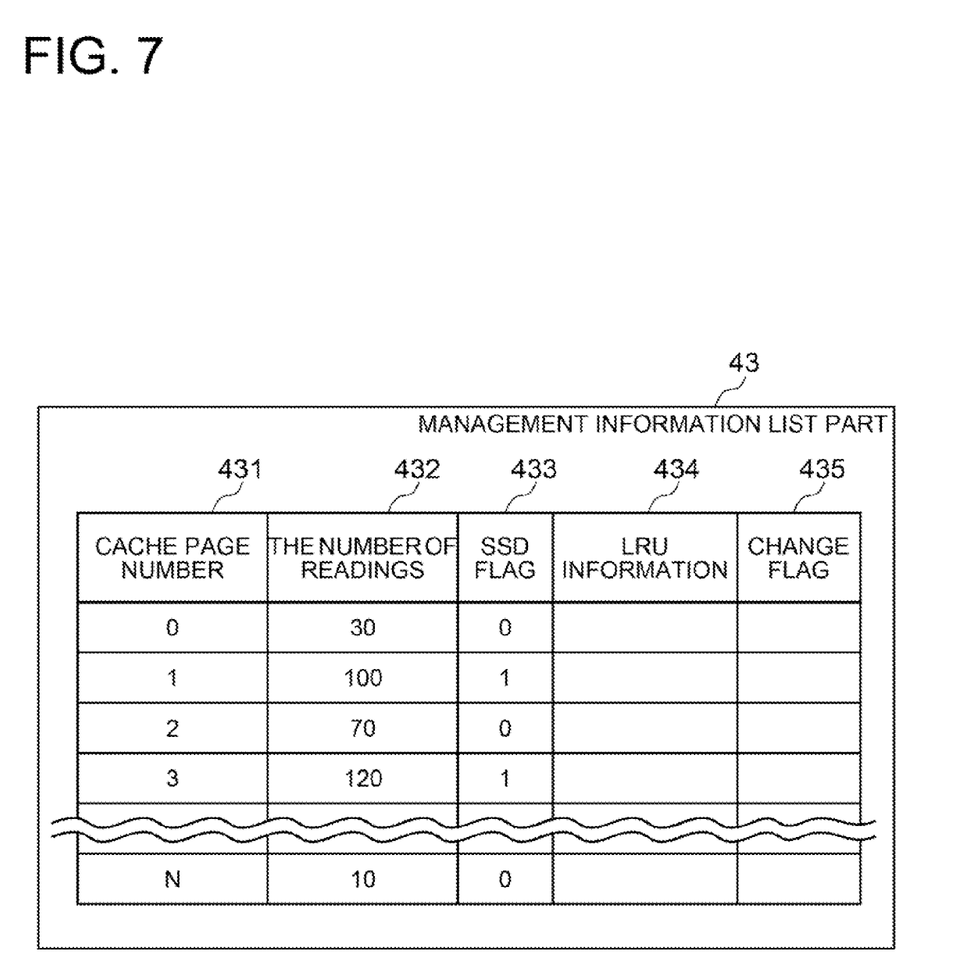
FIG. 7 is a diagram showing a specific example of a management information list part 43.

It is assumed that contents of the management information list part 43 are as shown in FIG. 7. In this example, the specified number of times (the specified number of times in Step S304 in FIG. 3) that validates the SSD flag valid is set to "80".

Given that, in this state, in Step S51 in FIG. 5, the page number of the cache page to be abandoned is found as "0". In the "0" page, since the number of readings is "30", that is, is equal to or smaller than the specified number of times, the SSD flag 433 in the "0" page is "0". Further, in this example, the change flag 435 in the "0" page is also "0". Accordingly, both of determination results in Step S52,S56 become NO, and the processing of abandoning the block stored in the cache page to be abandoned (Step S54) and the processing of clearing the number of readings 432 and so on recorded in association with the page number "0" (Step S55) are performed. In other words, when the bock stored in the cache page having the page number "0" with the small number of readings from the host device 9 is abandoned, processing of writing into the SSD 8 is not performed.

Given that, in Step S51 in FIG. 5, the page number of the cache page to be abandoned is found as "1", the following processing is performed. In the "1" page, since the number of readings is "100", that is, exceeds the specified number of times, the SSD flag 433 in the "1" page is "1". Accordingly, a determination result in Step S52 becomes YES and thus, the block stored in the cache page having the page number "1" is written into the SSD 8 (Step S43).

Through the above-mentioned operations, only the block often read from the cache memory 4 among blocks to be abandoned from the cache memory 4 can be stored in the SSD 8. This can reduce the number writings to the SSD 8, thereby extending the life of the SSD 8.

Figure 8:
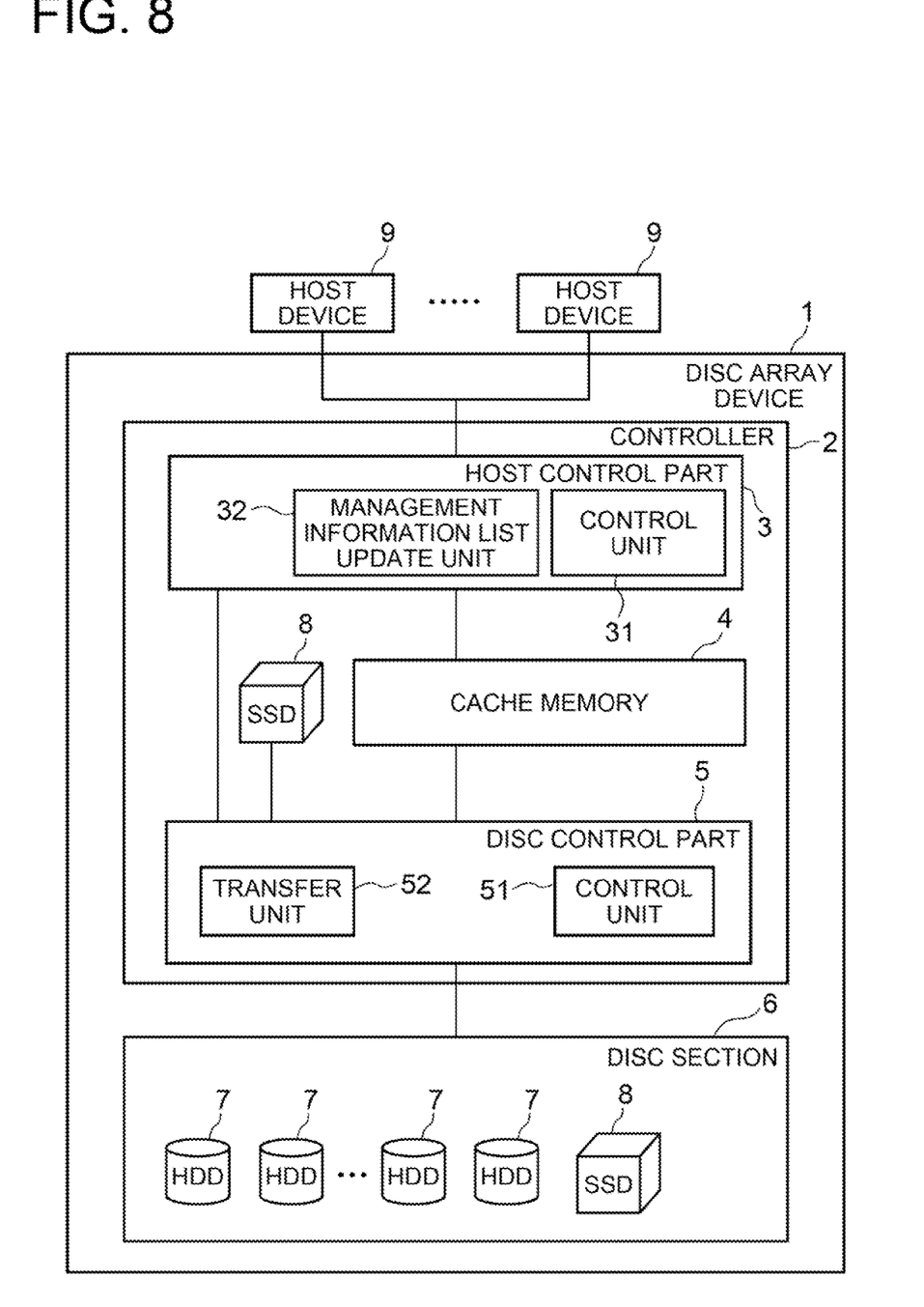
FIG. 8 is a block diagram showing a modification example of the exemplary embodiment.

Although the SSD 8 used as the secondary cache is disposed in the disc section 6 in the above description, the SSD 8 may be disposed in the controller 2 as shown in FIG. 8.

In this exemplary embodiment, it is possible to solve the problem that, when the SSD is used as the secondary cache, the life of the secondary cache is shortened. The reason is as follows. When a block is abandoned from the primary cache, it is determined whether or not the number of readings from the block exceeds a threshold, and only when the number of readings exceeds the threshold, the block is recorded in the SSD.

Further, in this exemplary embodiment, transfer processing from the HDD to the cache memory, which takes a transfer time, is performed only when the read request is made from the host device and requested data does not exist in the SSD. Therefore, when a block is abandoned from the cache memory, merely by recording only the often read block that is likely to be reaccessed from the host device, in the SSD, the response performance can be sufficiently improved.

<Supplementary Notes>

The whole or part of the exemplary embodiment disclosed above can be described as the following supplementary notes. Summary of configuration of a network management device according to the present invention will be described below. However, the present invention is not limited to the following configuration.

(Supplementary Note 1)

A disc device comprising:

a disc;

a primary cache that records a copy of a part of data recorded in the disc therein;

a secondary cache formed of an SSD, the secondary cache recording a copy of a part of data recorded in the disc therein; and a control unit, wherein in the case where the number of readings of a block selected to be abandoned in the primary cache in order to make a blank area in the primary cache exceeds a threshold, the control unit records the block in the secondary cache, and at read request, when data to be read exists in the primary cache, the control unit returns the data to be read in the primary cache to a requester, and when the data to be read does not exist in the primary cache and exists in the secondary cache, the control unit writes a block containing the data to be read that exists in the secondary cache into the primary cache and then, returns the data to be read to the requester.

(Supplementary Note 2)

The disc device according to supplementary note 1, wherein at write request, when data to be written exists in the primary cache, the control unit writes the data to be written into the primary cache, and when the data to be written does not exist in the primary cache and exists in the secondary cache, the control unit writes a block containing the data to be written that exists in the secondary cache into the primary cache and then, writes the data to be written into the primary cache, and when the data to be written does not exist in the primary cache and the secondary cache, the control unit writes the data to be written into a blank area in the primary cache.

(Supplementary Note 3)

The disc device according to supplementary note 1, wherein in the case where the number of readings from the block is less than the threshold, the control unit rewrites valid data in the block into the disc.

(Supplementary Note 4)

The disc device according to supplementary note 1, wherein in the case where the number of readings from the block is less than the threshold, the control unit determines whether or not writing into the block is performed, and rewrites valid data in the block into the disc when writing into the block is performed and abandons the block when writing into the block is not performed.

(Supplementary Note 5)

The disc device according to supplementary note 1, wherein further including a rewriting unit that periodically rewrites valid data in a block into which writing is performed into the disc, wherein in the case where the number of readings from the block is less than the threshold, the control unit abandons the block when the valid data in the block is rewritten by the rewriting unit, and rewrites the valid data in the block into the disc when the valid data in the block is not rewritten by the rewriting unit.

(Supplementary Note 6)

The disc device according to supplementary note 1, wherein the disc has an array structure.

(Supplementary Note 7)

A secondary cache utilizing method in a disc device including a disc, a primary cache that records a copy of a part of data recorded in the disc therein and a secondary cache formed of an SSD, the secondary cache recording a copy of a part of data recorded in the disc therein, wherein a control unit, wherein in the case where the number of readings of a block selected to be abandoned in the primary cache in order to make a blank area in the primary cache exceeds a threshold, the control unit records the block in the secondary cache, and at read request, when data to be read exists in the primary cache, the control unit returns the data to be read in the primary cache to a requester, and when the data to be read does not exist in the primary cache and exists in the secondary cache, the control unit writes a block containing the data to be read that exists in the secondary cache into the primary cache and then, returns the data to be read to the requester.

(Supplementary Note 8)

A computer-readable recording medium having a program for allowing a CPU mounted in a disc device including a disc, a primary cache that records a copy of a part of data recorded in the disc therein and a secondary cache formed of an SSD, the secondary cache recording a copy of a part of data recorded in the disc therein to function as a control unit, wherein in the case where the number of readings of a block selected to be abandoned in the primary cache in order to make a blank area in the primary cache exceeds a threshold, the control unit records the block in the secondary cache, and at read request, when data to be read exists in the primary cache, the control unit returns the data to be read in the primary cache to a requester, and when the data to be read does not exist in the primary cache and exists in the secondary cache, the control unit writes a block containing the data to be read that exists in the secondary cache into the primary cache and then, returns the data to be read to the requester.

(Supplementary Note 9)

A disc device comprising:

a disc;

a primary cache that records a copy of a part of data recorded in the disc therein;

a secondary cache formed of an SSD, the secondary cache recording a copy of a part of data recorded in the disc therein; and control means, in the case where the number of readings of a block selected to be abandoned in order to make a blank area in the primary cache from the primary cache exceeds a threshold, the control means recording the block in the secondary cache, and at read request, when data to be read exists in the primary cache, the control means returning the data to be read in the primary cache to a requester, and when the data to be read does not exist in the primary cache and exists in the secondary cache, the control means writing a block containing the data to be read that exists in the secondary cache into the primary cache and then, returning the data to be read to the requester.

The invention claimed is:

1. A disc device comprising:

a disc;

a primary cache that records a copy of a part of data recorded in the disc therein;

a secondary cache formed of an SSD, the secondary cache recording a copy of a part of data recorded in the disc therein;

a control unit, wherein a block is selected to be abandoned in the primary cache in order to make a blank area in the primary cache, and in the case where the number of readings of the block selected to be abandoned in the primary cache exceeds a threshold which is a value representing a plurality of times, the control unit records the block in the secondary cache, and at read request, when data to be read exists in the primary cache, the control unit returns the data to be read in the primary cache to a requester, and when the data to be read does not exist in the primary cache and exists in the secondary cache, the control unit writes a block containing the data to be read that exists in the secondary cache into the primary cache and then, returns the data to be read to the requester; and a management information list part for storing a number of readings that represent a number of readings of the block in a primary cache, and a flag that represents whether or not the number of readings of the block exceeds the threshold; wherein, the control unit determines whether or not a number of readings of a block selected to be abandoned in a primary cache exceeds the threshold, based on the flag of the management information list part.

2. The disc device according to claim 1, wherein at write request, when data to be written exists in the primary cache, the control unit writes the data to be written into the primary cache, and when the data to be written does not exist in the primary cache and exists in the secondary cache, the control unit writes a block containing the data to be written that exists in the secondary cache into the primary cache and then, writes the data to be written into the primary cache, and when the data to be written does not exist in the primary cache and the secondary cache, the control unit writes the data to be written into a blank area in the primary cache.

3. The disc device according to claim 1, wherein in the case where the number of readings from the block is less than the threshold, the control unit rewrites valid data in the block into the disc.

4. The disc device according to claim 1, wherein in the case where the number of readings from the block is less than the threshold, the control unit determines whether or not writing into the block is performed, and rewrites valid data in the block into the disc when writing into the block is performed and abandons the block when writing into the block is not performed.

5. The disc device according to claim 1 further including a rewriting unit that periodically rewrites valid data in a block into which writing is performed into the disc, wherein in the case where the number of readings from the block is less than the threshold, the control unit abandons the block when the valid data in the block is rewritten by the rewriting unit, and rewrites the valid data in the block into the disc when the valid data in the block is not rewritten by the rewriting unit.

6. The disc device according to claim 1, wherein
the disc has an array structure.

7. A secondary cache utilizing method in a disc device including a disc, a primary cache that records a copy of a part of data recorded in the disc therein and a secondary cache formed of an SSD, the secondary cache recording a copy of a part of data recorded in the disc therein, wherein a block is selected by a control unit to be abandoned in the primary cache in order to make a blank area in the primary cache and in the case where the number of readings of the block selected to be abandoned in the primary cache exceeds a threshold which is a value representing a plurality of times, the control unit records the block in the secondary cache, and at read request, when data to be read exists in the primary cache, the control unit returns the data to be read in the primary cache to a requester, and when the data to be read does not exist in the primary cache and exists in the secondary cache, the control unit writes a block containing the data to be read that exists in the secondary cache into the primary cache and then, returns the data to be read to the requester;

storing, by a management information list part, a number of readings that represent a number of readings of the block in a primary cache, and a flag that represents whether or not the number of readings of the block exceeds the threshold; and determining, by the control unit, whether or not a number of readings of a block selected to be abandoned in a primary cache exceeds the threshold, based on the flag of the management information list part.

8. A non-transitory computer-readable recording medium having a program for allowing a CPU mounted in a disc device including a disc, a primary cache that records a copy of a part of data recorded in the disc therein and a secondary cache formed of an SSD, the secondary cache recording a copy of a part of data recorded in the disc, the CPU functioning as a control unit, wherein a block is selected to be abandoned in the primary cache in order to make a blank area in the primary cache, and in the case where the number of readings of the block selected to be abandoned in the primary cache exceeds a threshold which is a value representing a plurality of times, the control unit records the block in the secondary cache, and at read request, when data to be read exists in the primary cache, the control unit returns the data to be read in the primary cache to a requester, and when the data to be read does not exist in the primary cache and exists in the secondary cache, the control unit writes a block containing the data to be read that exists in the secondary cache into the primary cache and then, returns the data to be read to the requester;

storing, by a management information list part, a number of readings that represent a number of readings of the block in a primary cache, and a flag that represents whether or not the number of readings of the block exceeds the threshold; and determining, by the control unit, whether or not a number of readings of a block selected to be abandoned in a primary cache exceeds the threshold, based on the flag of the management information list part.

* * * * *